United States Patent [19]
Gjertsen et al.

[11] Patent Number: 4,684,499
[45] Date of Patent: Aug. 4, 1987

[54] BURNABLE ABSORBER ROD RELEASABLE LATCHING STRUCTURE

[75] Inventors: Robert K. Gjertsen, Monroeville Boro; John F. Wilson, Murrysville, both of Pa.

[73] Assignee: Westinghouse Electric Corp., Pittsburgh, Pa.

[21] Appl. No.: 807,142

[22] Filed: Dec. 10, 1985

[51] Int. Cl.$^4$ .................................................. G21C 3/32
[52] U.S. Cl. ..................................... 376/446; 376/261; 376/327; 376/447; 376/451
[58] Field of Search ............... 376/446, 451, 440, 447, 376/260, 261, 449, 353, 327

[56] References Cited

U.S. PATENT DOCUMENTS

| | | |
|---|---|---|
| 2,983,662 | 5/1961 | Shillitto . |
| 2,990,359 | 6/1961 | Wyman . |
| 3,147,194 | 9/1964 | Smith . |
| 3,150,056 | 9/1964 | Dent et al. . |
| 3,152,830 | 10/1964 | Pounder et al. . |
| 3,175,957 | 3/1965 | Costes et al. . |
| 3,189,525 | 6/1965 | Davis . |
| 3,194,746 | 7/1965 | Hackett . |
| 3,295,883 | 1/1967 | Dupuy et al. . |
| 3,310,337 | 3/1967 | Riemenschneider . |
| 3,361,857 | 1/1968 | Rose . |
| 3,388,942 | 6/1968 | Johnson . |
| 3,510,398 | 5/1970 | Wood . |
| 4,036,692 | 7/1977 | Walton ................................ 376/440 |
| 4,152,206 | 5/1979 | Jabsen . |
| 4,344,914 | 8/1982 | Rosa .................................... 376/437 |
| 4,391,771 | 7/1983 | Anthony ............................. 376/451 |
| 4,426,353 | 1/1984 | Chollet ................................ 376/262 |
| 4,563,328 | 1/1986 | Steinke ............................... 376/446 |
| 4,599,213 | 7/1986 | Leclercq et al. .................... 376/446 |

FOREIGN PATENT DOCUMENTS

| | | | |
|---|---|---|---|
| 0098774 | 1/1984 | European Pat. Off. ............ | 376/446 |
| 0140588 | 5/1985 | European Pat. Off. ............ | 376/446 |
| 3228380 | 2/1984 | Fed. Rep. of Germany ...... | 376/446 |

Primary Examiner—Deborah L. Kyle
Assistant Examiner—Daniel Wasil

[57] ABSTRACT

A fuel assembly with a top nozzle having an adapter plate, at least one guide thimble connected to the adapter plate, and a burnable absorber rod disposed within the guide thimble, includes a releasable latching structure for releasably interconnecting an end of the absorber rod to the adapter plate. The latching structure includes a recess defined in the adapter plate within a passageway through the plate, a mounting body attached to the end of the absorber rod and extending axially upward therefrom through the passageway and above the adapter plate, and a spring latch disposed about the mounting body above the adapter plate. The spring latch has circumferentially spaced latch fingers extending downwardly toward the adapter plate. Each latch finger is deflectible toward and away from the mounting body between an outer latching position in which the finger engages the recess in the adapter plate and retains the absorber rod disposed in the guide thimble and an inner unlatching position in which the finger disengages from the recess in the adapter plate and allows removal of the absorber rod from the guide thimble. The latch finger extends into the adapter plate passageway for engaging with and disengaging from the passageway recess when the finger is deflected between its respective latching and unlatching positions. The latch finger has a latching key defined on its lower end being configured to engage the adapter plate within the recess formed in the passageway of the plate. Also, the mounting body has a portion generally coextensive with the latch finger and defining a recessed region surrounding the mounting body. The latch finger is disposed generally outside of the recessed region when in its latching position and generally within the recessed region when in its unlatching position.

11 Claims, 11 Drawing Figures

BURNABLE ABSORBER ROD RELEASABLE LATCHING STRUCTURE

CROSS REFERENCE TO RELATED APPLICATIONS

Reference is hereby made to the following copending applications dealing with related subject matter and assigned to the asssignee of the present invention:

1. "Standardized Reduced Length Burnable Absorber Rods For A Nuclear Reactor" by Barry R. Cooney et al, assigned U.S. Ser. No. 718,902 and filed Apr. 1, 1985 (W.E. 52,386).

2. "Burnable Absorber Rod Push Out Attachment Joint" by Joseph B. Mayers et al, assigned U.S. Ser. No. 774,850 and filed Sept. 12, 1985 (W.E. 52,875).

3. "Nuclear Reactor Fuel Assembly With A Removable Top Nozzles" by John M. Shallenberger et al, assigned U.S, Ser. No. 644,758 and filed Aug. 27, 1984 (W.E. 51,311I), now U.S. Pat. No. 4,631,168.

4. "Improved Guide Thimble Captured Locking Tube In A Reconstitutable Fuel Assembly" by Robert K. Gjertsen et al, assigned U.S. Ser. No. 775,208 and filed Sept. 12, 1985 (W.E. 52,881),

BACKGROUND OF THE INVENTION

1. Field of the Invention

The present invention relates generally to fuel assemblies for nuclear reactors and, more particularly, is concerned with a unique releasable latching structure for burnable absorber rods which readily permits attachment and detachment of such rods directly to and from the adapter plate of the fuel assembly top nozzle and facilitates consolidation of the spent absorber rods.

2. Description of the Prior Art

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron aborsber control rods within the reactor core. The level of neutron flux and thus the heat output of the core is normally regulated by the movement of the control rods into and from the guide thimbles.

Also, it is conventional practice to design an excessive amount of neutron flux into the reactor core at start-up so that as the flux is depleted over the life of the core there will still be sufficient reactivity to sustain core operation over a long period of time. In view of this practice, in some reactor applications burnable absorber or poison rods are inserted within the guide thimbles of some fuel assemblies to assist the control rods in the guide thimbles of other fuel assemblies in maintaining the neutron flux or reactivity of the reactor core relatively constant over its lifetime. The burnable poison rods, like the control rods, contain neutron absorber material. They differ from the control rods mainly in that they are maintained in stationary positions within the guide thimbles during their period of use in the core. The overall advantages to be gained in using burnable poison rods at stationary positions in a nuclear reactor core are described in U.S. Pat. Nos. (3,361,857) to Rose and (3,510,388) to Wood.

Also, the availability of assemblies of burnable absorber rods on a rapid response basis is required at reactor fuel reload time. The present design of the burnable absorber assemblies, being similar to those illustrated and described in the first two patent applications cross-referenced above, includes a plurality of precisely spaced apart absorber rods and thimble plugs fastened at their upper ends to a support Plate which also mounts a central hold-down device. In view of the multiplicity of components which make up the absorber assemblies and the precise spacing required between them when they are assembled together, it has been found necessary to assemble the absorber assemblies at a manufacturing facility located remote from the reactor site. The final absorber assemblies are then shipped with the fuel assemblies to the reactor site. This means that the particular absorber assembly design must be specified well in advance of the time of actual reload.

However, it is desirable to have the flexibility of specifying the burnable absorber assembly configurations at the latest possible time so that the nuclear reload design can be fine tuned based on the latest reactor operations input. The ultimate absorber assembly configurations specified may advantageously include, for example, twelve burnable absorber rods and twelve thimble plugs per assembly or other combinations of absorber rods and thimble plugs. To accommodate these variations in configurations with the present design, within the time frame mentioned above, would require final assembly of the burnable absorber assemblies at the reactor site. This is not a practical alternative in view of the present design of the absorber assembly.

Consequently, a need exists for a different approach to absorber assembly design which will provide greater flexibility in arriving at what the final configuration should be, based on substantially current reactor operating information.

SUMMARY OF THE INVENTION

The present invention provides a releasable latching structure for members, such as burnable absorber rods and thimble plugs, which is designed to satisfy the aforementioned needs. The releasable latching structure of the present invention permits handling of absorber rods and thimble plugs in a manner which allows their final arrangement to be specified just before reload time so that the latest reactor operating information can be taken into consideration. At the same time, there is no onsite manufacturing required. Basically, absorber rods and thimble plugs individually are easily attached directly to the top nozzle adapter plate which eliminates the need for the support plate and hold-down device of the previous design. Now, an inventory of individual absorber rods and thimble plugs can be sent to the reactor site prior to refueling. Then, when the final burnable absorber design for each fuel assembly is specified, the required configuration of absorber rods and thimble plugs can be inserted into the fuel assembly. The approach avoids the need for onsite manufacturing of absorber assemblies. An additional benefit of the present invention is that, later on, the spent absorber rods can be easily released from the adapter plate and readily consolidated in a consolidation cannister.

Accordingly, the present invention is directed to a latching structure for releasably attaching an elongated member at an end thereof to a top nozzle adapter plate of a nuclear fuel assembly. The latching structure includes: (a) a mounting body attached to the end of the elongated member and extending axially outward therefrom; and (b) a spring latch disposed about the mounting body and having at least one latch finger movable toward and away from the body between an outer latching position in which the finger is adapted to engage the adapter plate and retain the elongated member in a stationary relationship with respect to the adapter plate and an inner unlatching position in which the finger is adapted to disengage from the adapter plate and allow removal of the member from the adapter plate.

More particularly, the mounting body includes an inner plug portion attached to the end of the elongated member, an outer end portion having a groove defined therein, and a middle body portion having a configuration which generally defines a recessed region surrounding the mounting body at the middle portion thereof.

Further, the spring latch includes an outer ring portion disposed about the outer end portion of the mounting body and having a bulge formed therein which extends into the groove in the outer end portion so as to connect the spring latch to the mounting body. Also, the spring latch includes a plurality of circumferentially spaced apart latch fingers connected at their outer ends to the outer ring portion in cantilever fashion and extending along the middle body portion of the mounting body. The fingers are radially deflectible toward and away from the middle body portion between the outer latching and inner unlatching positions. In their outer latching positions, the fingers are adapted to engage the adapter plate and are generally disposed outside of the recessed region surrounding the mounting body middle portion. In their inner unlatching positions, the fingers are adapted to disengage from the adapter plate and are generally disposed within the recessed region surrounding the mounting body middle portion. Each of the latch fingers includes a latching key defined on an inner end thereof being configured to engage with and disengage from the adapter plate when the finger is deflected between its respective latching and unlatching positions.

The present invention is also set forth in a fuel assembly including a top nozzle having an adapter plate with at least one passageway defined therethrough, at least one guide thimble connected to the adapter plate, and a burnable absorber rod disposed within the guide thimble. The invention relates to a releasable latching structure for releasably interconnecting an end of the absorber rod to the adapter plate which includes: (a) engagable means defined in the adapter plate; (b) a mounting body attached to the end of the absorber rod and extending axially upward therefrom through the passageway and above the adapter plate; and (c) a spring latch disposed about the mounting body above the adapter plate and having at least one latch finger extending downwardly toward the adapter plate. The latch finger is deflectible toward and away from the mounting body between an outer latching position in which the finger engages the engagable means on the adapter plate and retains the absorber rod disposed in the guide thimble and an inner unlatching position in which the finger disengages from the engagable means on the adapter plate and allows removal of the absorber rod from the guide thimble. Also, means is defined on the mounting body and spring latch for attaching the spring latch to the body.

More particularly, the engagable means is in the form of a recess formed in the adapter plate within the passageway therein. The latch finger extends into the adapter plate passageway for engaging with and disengaging from the passageway recess when the finger is deflected between its respective latching and unlatching positions. Further, the latch finger has a latching key defined on its lower end being configured to engage the adapter plate within the recess formed in the passageway of the plate. Also, the mounting body has a portion generally coextensive with the latch finger and defining a recessed region along the mounting body. The latch finger is disposed generally outside of the recessed region when in its latching position and generally within the recessed region when in its unlatching position.

These and other advantages and attainments of the present invention will become apparent to those skilled in the art upon a reading of the following detailed description when taken in conjunction with the drawings wherein there is shown and described an illustrative embodiment of the invention,

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
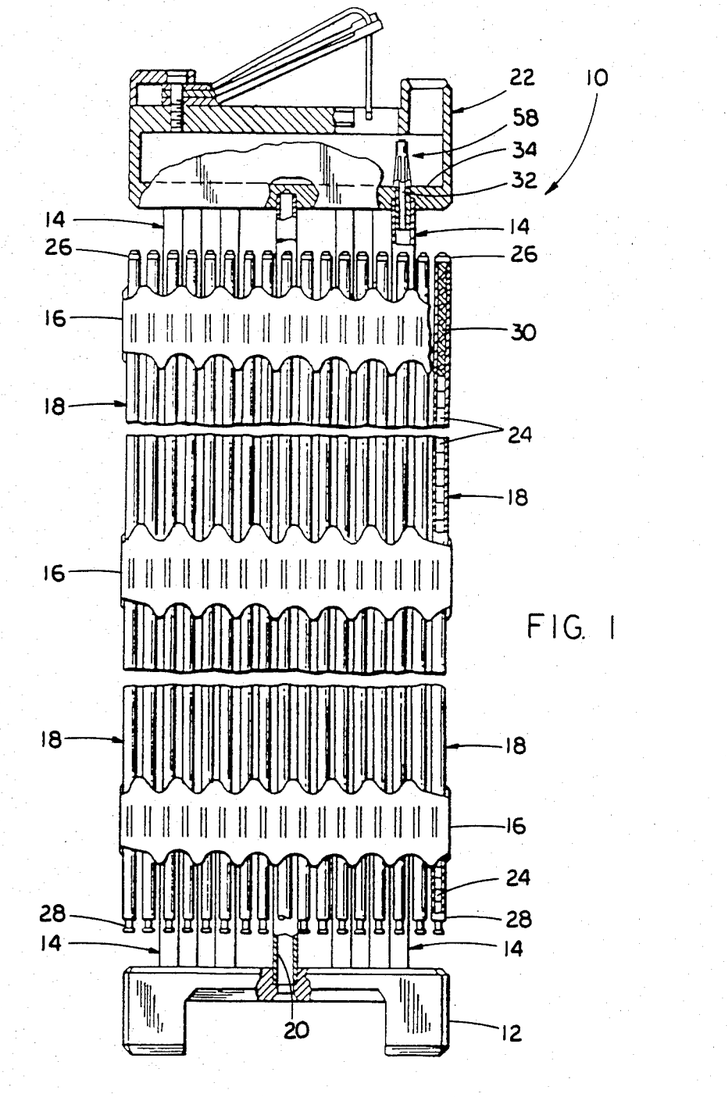
FIG. 1 is a side elevational view, with parts partially sectioned and broken away for purposes of clarity, of a fuel assembly in which absorber rods are attached to the top nozzle adapter plate of the assembly by releasable latching structures constructed in accordance with the principles of the present invention.

Referring now to the drawings, and particularly to FIG. 1, there is shown an elevational view of a nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

In the operation of a nuclear reactor, it is common practice to provide an excess of reactivity initially in the reactor core and, at the same time, provide means to maintain the reactivity relatively constant over its lifetime. Such means commonly takes the form of control rods (not shown) supported for movement into the guide thimbles of some fuel assemblies in the core and burnable absorber rods 32 supported stationarily in the guide thimbles 14 of other fuel assemlies in the core. The stationary absorber rods 32 assist the movable control rods in maintaining a substantially constant level of neutron flux or reactivity in the core throughout its operating cycle. Before describing the means of the present invention for stationarily attaching the burnable absorber rods 32 to the top nozzle 22, the means by which the guide thimbles 14 are attached to the top nozzle will first be briefly described.

Top Nozzle Attaching Structure

Figure 2:
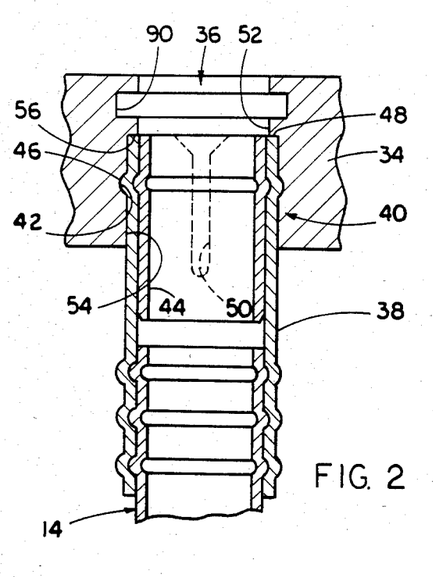
FIG. 2 is an enlarged fragmentary detailed sectional view of the fuel assembly of FIG. 1, showing the assembled components of a releasable attaching structure associated with the top nozzle adapter plate and the guide thimbles of the fuel assembly which allow the top nozzle to be removable from the fuel assembly.
Figure 11:
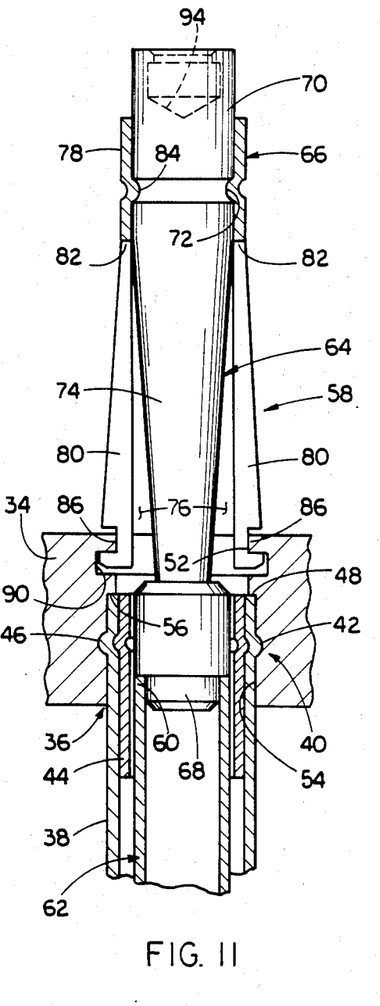
FIG. 11 is an enlarged view of the absorber rod upper end with the latching structure thereon as seen in FIG. 4, but showing the absorber rod extending in a guide thimble with its upper end disposed through a passageway of the top nozzle adapter plate and the spring latch disposed in latching relationship with the adapter plate.

As illustrated in FIGS. 1, 2 and 11, the top nozzle 22 has a lower adapter plate 34 with a plurality of passageways 36 (only one being shown) formed through the adapter plate. Each guide thimble 14 has its uppermost end portion 38 coaxially positioned within one passageway 36 in the adapter plate 34. For gaining access to the fuel rods 18 in reconstitution of the fuel assembly 10, the adapter plate 34 of the top nozzle 22 is removably connected to the upper end portions 38 of the guide thimbles 14 by an attaching structure, generally designated 40, which provides a plurality of structural joints between the top nozzle 22 and the guide thimbles 14 of the fuel assembly skeleton. The attaching structure 40 is generally the same as illustrated and described in the third and fourth applications cross-referenced above, but will be described herein to the extent necessary to facilitate an understanding of the present invention.

As best seen in FIGS. 2 through 11, the top nozzle attaching structure 40 which makes the fuel assembly 10 reconstitutable includes a plurality of outer sockets (only one being shown) defined in the top nozzle adapter plate 34 by the plurality of passageways 38 (also only one being shown) which each contains an annular circumferential groove 42 (only one being shown), a plurality of inner sockets (only one being shown) defined on the upper end portions 38 (only one being shown) of the guide thimbles 14, and a plurality of locking tubes 44 (only one being shown) inserted in the inner sockets to maintain them in locking engagement within the outer sockets.

Each inner socket is defined by an annular circumferential bugle 46 on the hollow upper end portion 38 of one guide thimble 14 only a short distance below its upper edge 48. A plurality of elongated axial slots 50 (only one being shown in FIG. 2) are formed in the upper end portion 38 of each guide thimble 14 to permit inward elastic collapse of the slotted end portion to a compressed position so as to allow the circumferential bulge 46 thereon to be inserted within and removed from the annular groove 42 via the adapter plate passageway 36. The annular bulge 46 seats in the annular groove 42 when the guide thimble end portion 38 is inserted in the adapter plate passageway 36 and has assumed an expanded position. In such manner, the inner socket of each guide thimble 14 is inserted into and withdrawn from locking engagement with one of the outer sockets of the adapter plate 34.

More particularly, the axially extending passageway 36 in the adapter plate 34 which defines the outer socket is composed of an upper bore 52 and a lower bore 54. The lower bore 52 is of greater axial length than the upper bore 54 and contains the annular groove 42 which is spaced a short distance below a ledge 56 formed at the intersection of the upper and lower bores 52,54. The lower bore 54 has a diameter which is greater than that of the upper bore 52; therefore, the ledge 56 faces in a downward direction. The primary purpose of the ledge 56 is to serve as a stop or an alignment guide for proper axial positioning of the guide thimble upper end portion 38 in the passageway 36 when the inner socket is inserted into the outer socket. As seen in FIGS. 2 to 11, the upper edge 48 of the guide thimble 14 abuts the ledge 56.

Finally, each locking tube 44 is inserted from above the top nozzle 22 into its respective locking position in the hollow upper end portion 38 of one guide thimble 14 forming one inner socket. When the locking tube 44 is inserted in its locking position, as seen in FIGS. 2 and 11, it retains the bulge 46 of the inner socket in the latter's expanded locking engagement with the annular groove 42 and prevents the inner socket from being moved to its compressed releasing position in which it could be withdrawn from the outer socket. In such manner, each locking tube 44 maintains its respective one inner socket in locking engagement with the outer socket, and thereby retains the structural joint formed by the attachment of the adapter plate 34 of the top nozzle 22 on the upper end portion 38 of each guide thimble 14 in an assembled rigid form.

Burnable Absorber Rod Releasably Latching Structure

Figure 3:
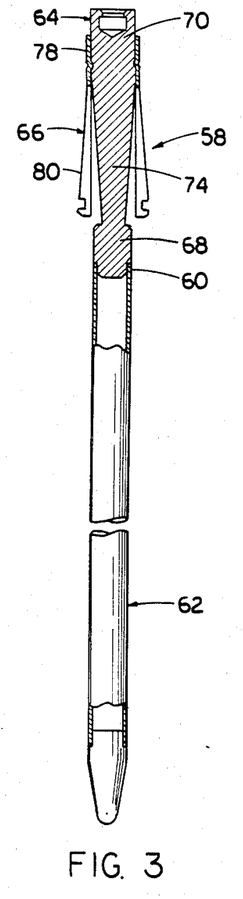
FIG. 3 is an enlarged elevational view of one burnable absorber rod having the releasable latching structure of the present invention on its upper end, the absorber rod being shown removed from the fuel assembly of FIG. 1 and illustrated in foreshortened form, with parts partially sectioned and broken away for purposes of clarity.
Figure 4:
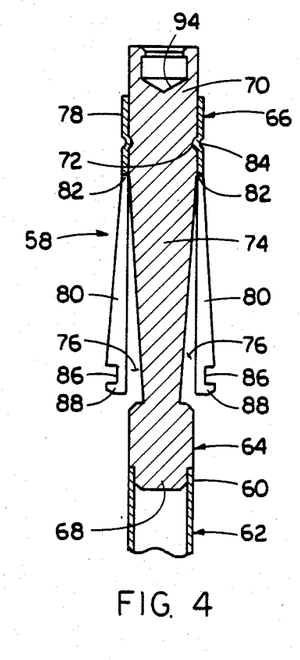
FIG. 4 is a fragmentary detailed sectional view of the absorber rod of FIG. 3, showing the releasable latching structure on its upper end on an enlarged scale.
Figures 5, 7:
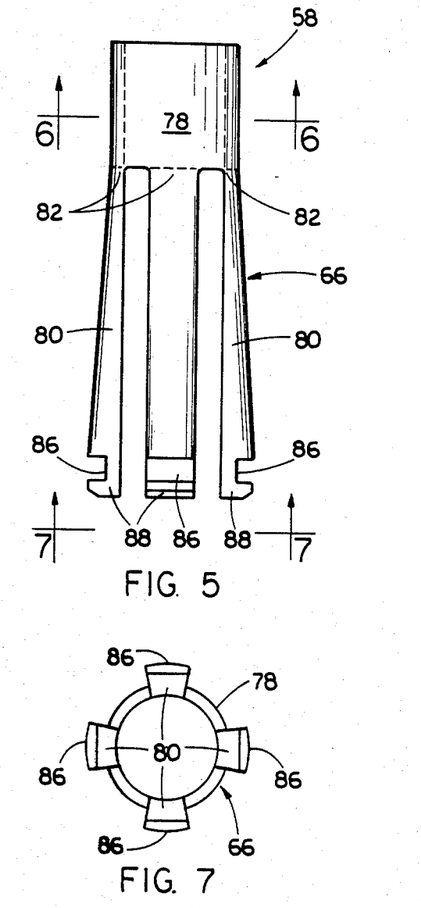
FIG. 5 is an enlarged elevational view of a latch spring of the latching structure of FIG. 4, being shown disassembled from the latch.
FIG. 7 is a bottom plan view of the latch spring as seen along line 7—7 of FIG. 5.
Figure 6:
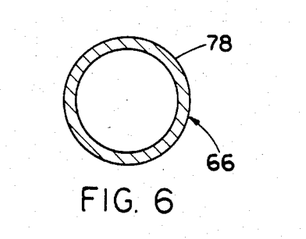
FIG. 6 is a sectional view of the latch spring as taken along line 6—6 of FIG. 5.
Figure 8:
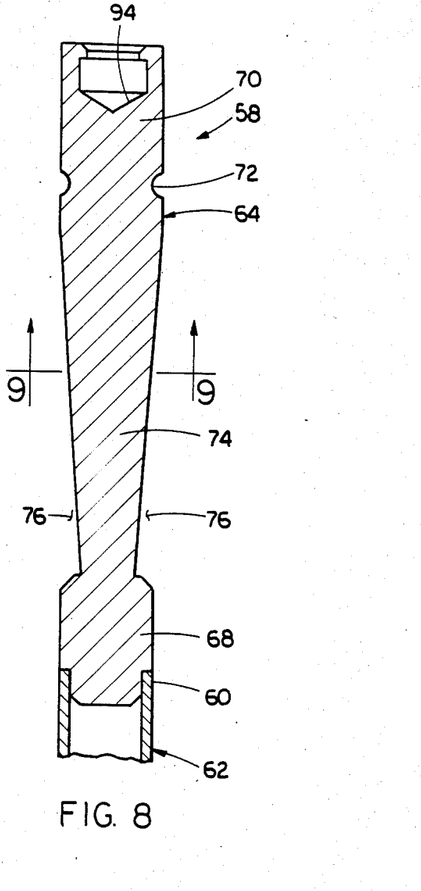
FIG. 8 is an enlarged elevational view, in section, of an elongated mounting body of the latching structure of FIG. 4, showing the body attached on and extends upwardly from the upper end of the absorber rod and is adapted to receive and stationarily mount the latch spring of FIG. 5.
Figure 9:
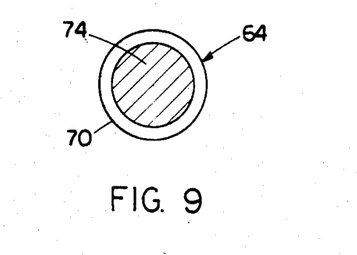
FIG. 9 is a sectional view of the mounting body as taken along line 9—9 of FIG. 8.

Heretofore, the burnable absorber rods and thimble plugs have been combined into an assembly in which they are rigidly attached at their upper ends to a support plate which rests upon the adapter plate of the top nozzle with the rods and plugs extending downwardly through the adapter plate passageways into the guide thimbles. This prior attachment design requires the absorber assembly to be completed at a manufacturing facility normally located away from the reactor site. Such requirement eliminates the capability of specifying the absorber configuration at the latest possible time just before actual refueling of the reactor is to take place and thereby prevents fine tuning of the nuclear design based on the latest reactor operations input. The releasable latching structure of the present invention, as seen in FIGS. 3 and 4 and being generally identified by the number 58, was originated to overcome such obstacles and provide the desired flexibility to decide upon the final configuration of the absorber assembly based on last minute reactor operating information just before fuel reloading is to be carried out.

Referring now to FIGS. 3 to 9, there is shown the preferred embodiment of the releasable latching structure 58 for releasably attaching the upper end 60 of each absorber rod 62 and thimble plug (not shown) directly to the top nozzle adapter plate 34. For purposes of brevity and clarity in describing the present invention, it should be understood that, in addition to the absorber rod 62, the latching structure 58 is applicable for use on any other elongated member which is inserted within one of the guide thimbles 14, such as a thimble plug. Therefore, since showing the latching structure 58 affixed on a conventional thimble plug which would merely be duplicative of what is already shown in FIGS. 3, 4, 10 and 11, it should be understood that whenever reference is made to the latching structure being attached on an absorber rod the same would apply to a thimble plug.

Basically, the releasable latching structure 58 includes a generally cylindrical mounting body 64 and a generally cylindrical latch spring 66. The mounting body 64 is composed of a generally cylindrical inner plug portion 68 attached to and sealing the upper end 60 of the absorber rod 62, a generally cylindrical outer end portion 70 having an annular circumferential groove 72 defined therein, and a middle body portion 74 integrally interconnecting the inner and outer portions 68,70. The middle body portion 74 has a generally conical configuration tapering inwardly from the outer end portion 70 to the inner plug portion 68 so as to define a tapering recessed void region, indicated generally by the numeral 76, which surrounds the mounting body 64 at the middle portion thereof.

The spring latch 66 of the latching structure 58 is composed of a generally cylindrical outer ring portion 78 disposed about the outer end portion 70 of the mounting body 64 and a plurality of circumferentially spaced apart latch fingers 80 connected at their outer ends 82 to the outer ring portion 78 in cantilever fashion and extending downwardly therefrom along the middle body portion 74 of the mounting body 64. The outer ring portion 78 has an annular circumferential bulge 84 formed therein which extends into the circumferential groove 72 in the outer end ptortion 70 so as to connect the sptring latch 66 to the mounting body 64.

Figure 10:
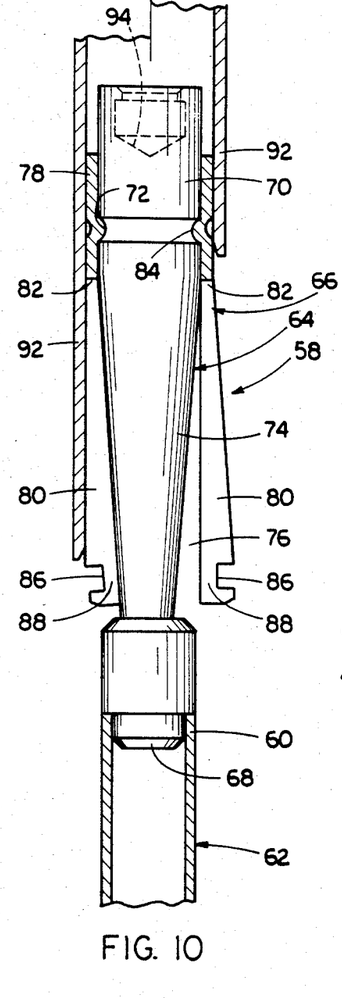
FIG. 10 is an enlarged view of the absorber rod upper end with the latching structure thereon as seen in FIG. 4, but showing on the left side of the latch an actuating sleeve, in section, extended downward along the spring so as to forcibly engage and deflect all of the latch fingers of the spring to their inward unlatching positions, whereas showing on the right side of the latch the sleeve retracted upward so as to disengage from the latch fingers of the spring and allow them to return to their normal outward latching positions.

More particularly, the latch fingers 80 having external latching keys 86 defined on their inner ends 88 and are radially deflectible toward and away from the middle body portion 74 of the mounting body 64 between outer latching positions, as seen with respect to the finger 80a on the right side of FIG. 10, and inner unlatching positions, as seen with respect to the finger 80b on the left side of FIG. 10. The normal relaxed position to which each of the fingers 80 is biased to return is the latching position seen on the right side of FIG. 10. The fingers 80 are resiliently flexible so that they will yield when sufficient force is aptpled to them in a radially inward direction causing each to be deflected inwardly against its bias toward the middle body portion 74.

As clearly seen in FIG. 10, when the fingers 80 are disposed in their outer latching positions (as is finger 80a on the right side of FIG. 10), the fingers are disposed generally outside of the recessed region 76 surrounding the mounting body middle portion 74. On the other hand, when the fingers 80 are disposed in their inner unlatching positions (as is finger 80b on the left side of FIG. 10), the fingers are disposed generally within the recessed region 76.

Referring now to FIG. 11, the releasable latching structure 58 is shown interconnecting the upper end 60 of the absorber rod 62 to the adapter plate 34 of the fuel assembly top nozzle 22, with the absorber rod 62 being disposed within a guide thimble 14. The upper end portion 38 of the guide thimble extends into adapter plate passageway 36 and is locked therein by the attaching structure 40 which includes the locking tube 44. The mounting body 64 of the latching structure 58 is attached at its inner plug portion 68 to the upper end 60 of the absorber rod 62 and extends axially upward therefrom through the adapter ptlate passageway 36 and locking tube 44 to its outer end portion 70 disposed above the adapter plate 34. The middle body portion 74 of the mounting body 64 extends from above the adapter plate 34 downwardly into the passageway 36 to approximately the depth of the ledge 56. In such manner, a circumferential recess 90 defined in the adapter plate 34 within the upper bore 52 of its passageway 36 is accessible from above the adapter plate 34 through the recessed void region 76 surrounding the middle body portion 74.

The spring latch 88 of the latching structure 58 is disposed about the mounting body 64 generally above the adapter plate 34 and its latch fingers 80 extend downwardly along the middle body portion 74 toward and into the adapter plate passageway 36. The latching keys 86 on the inner ends 88 of the latch fingers 80 are disposed within the passageway 36, aligned with the passageway recess 90, and configured to engage the adapter plate 34 within the recess 90. When the latch fingers 80 are disposed in their latching positions as seen in FIG. 11, they are generally outside of the recessed region 76 with their latching keys 86 engaged within the adapter plate recess 90. The absorber rod 62 is then retained in a stationary relationship with respect to the adapter plate 34.

By insertion of a sleeve 92 over the latch fingers 80, as shown in FIG. 10, from its uppter position to its lower position, the latch fingers 80 are yieldably deflected radially inward toward the mounting body 64, causing the latching keys 86 thereon to disengage from the adapter plate recess 90. The latch fingers 80 are then generally disposed within the recessed region 76 surrounding the mounting body 64 and their latching keys 86 displaced inwardly to allow sufficient clearance for the absorber rod 62, and the latching structure 58 therewith, to pass upwardly through the passageway 36 for removing the absorber rod 62 from the guide thimble 14. An undercut cavity 94 formed in the top end of the outer end portion 70 of the mounting body 64 is configured to receive a gripper tool (not shown) for use in insertion and removal of the absorber rod 62.

The spring latch 66 is preferably machined from cold worked stainless steel tube. The fingers 80 are so formed so that in the relaxed position (no external forces applied) the latching keys 86 extend radially outward well beyond the diameter of the recess 90 formed in the adapter plate 34. Thus, when the absorber rod 62 and latching structure 58 are installed in the guide thimble 14 and adapter plate 34, the keys 86 are forced into the recess 90. Since the upper engaging sides of the keys 86 and the recess 90 are flat, any upward force on the absorber rod 62 does not tend to force the keys 86 and latch fingers 80 inward. Also, since there are multiple spring fingers 80, there is redundancy in the locking structure 58. A single absorber rod 62 requires about twelve pounds of force to hold it in place against the hydraulic flow forces. Twelve pounds of force is an amount well within the capability of the locking structure 58.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemptlary embodiment thereof.

We claim:

1. In combination with an elongated nuclear reactivity control member, a releasable latching structure useful for releasably attaching said control member at an end thereof to a top nozzle adapter plate of a nuclear fuel assembly, comprising:
    (a) a mounting body including an inner plug portion attached to said end of said control member and an outer end portion disposed axially outward from said inner plug portion and said end of said member; and
    (b) a spring latch disposed about said mounting body and being attached to said outer end portion thereof, said spring latch having at least one latch finger extending toward said inner plug portion of said body and being movable toward and away from said body between an outer latching position in which said finger is adatped to engage a fuel assembly top nozzle adapter plate and retain said elongated member in a stationary relationship with respect to the adapter plate and an inner unlatching position in which said finger is adapted to disengage from the adapter plate and allow removal of said member from the adapter plate.

2. The latching structure as recited in claim 1, wherein said outer end portion of said mounting body has a groove defined therein.

3. The latching structure as recited in claim 2, wherein said spring latch includes an outer ring portion disposed about said outer end portion of said mounting body and having a bulge formed therein which extends into said groove in said outer end portion so as to connect said spring latch to said mounting body.

4. The latching structure as recited in claim 3, wherein said mounting body includes a middle body portion having a configuration which generally defines a recessed region surrounding said mounting body at said middle body portion thereof.

5. The latching structure as recited in claim 4, wherein said spring latch includes a plurality of circumferentially spaced apart latch fingers connected at their outer ends to said outer ring portion in cantilever fashion and extending along said middle body portion of said mounting body, said fingers being radially deflectible toward and away from said middle body portion between said outer latching positions in which said fingers are adapted to engage said adapter plate and are generally disposed outside of said recessed region surrounding said mounting body middle portion and said inner unlatching positions in which said fingers are adapted to disengage from said adapter plate and are generally disposed within said recessed region surrounding said mounting body middle portion.

6. The latching structure as recited in claim 5, wherein each of said latch fingers includes a latching key defined on an inner end thereof being configured to engage with and disengage from said adapter plate when said finger is deflected between its respective latching and unlatching positions.

7. In combination with an elongated nuclear reactivity control member, a releasable latching structure useful for releasably attaching said control member at an end thereof to a top nozzle adapter plate of a nuclear fuel assembly, comprising:

(a) a mounting body having
  (i) a generally cylindrical inner plug portion attached to said end of said elongated member,
  (ii) a generally cylindrical outer end portion having an annular circumferential groove defined therein, and
  (iii) a middle body portion interconnecting said inner and outer portions and having a generally conical configuration tapering inwardly from said outer end portion to said inner plug portion so as to define a tapering recessed region surrounding said mounting body at said middle portion thereof; and (b) a generally cylindrical spring latch having
  (i) a generally cylindrical outer ring portion disposed about said outer end portion of said mounting body and having an annular circumferential bulge formed therein which extends into said circumferential groove in said outer end portion so as to connect said spring latch to said mounting body, and
  (ii) a plurality of circumferentially spaced apart latch fingers connected at their outer ends to said outer ring portion in cantilever fashion and extending along said middle body portion of said mounting body, said fingers having external latching keys defined on their inner ends and being radially deflectible toward and away from said middle body portion between an outer latching position in which said fingers are disposed outside of said recessed region surrounding said mounting body middle portion and said latching keys on said inner ends of said fingers are adapted to engage a fuel assembly top nozzle adapter plate and retain said elongated member in a stationary relationship with respect to the plate and an inner unlatching position in which said fingers are disposed within said recessed region surrounding said mounting body middle portion and said latching keys on said inner ends of said fingers are adapted to disengage from the plate and allow removal of said elongated member from the adapter plate.

8. In a fuel assembly including a top nozzle having an adapter plate with at least one passageway defined therethrough, at least one guide thimble connected to said adapter plate, and a burnable absorber rod disposed within said guide thimble, a releasable latching structure for releasably interconnecting an end of said absorber rod to said adapter plate, comprising:

(a) engagable means defined in said adapter plate;

(b) a mounting body attached to said end of said absorber rod and extending axially upward therefrom through said passageway and above said adapter plate;

(c) a string latch disposed about said mounting body above said adapter plate and having at least one latch finger extending downwardly toward said adapter plate, said latch finger being deflectible toward and away from said mounting body between an outer latching position in which said finger engages said engagable means on said adapter plate and retains said absorber rod disposed in said guide thimble and an inner unlatching position in which said finger disengages from said engagable means on said adapter plate and allows removal of said absorber rod from said guide thimble; and (d) means defined on said mounting body and string latch for attaching said spring latch to said body.

9. The fuel assembly as recited in claim 8, wherein:
said engagable means is in the form of a recess formed in said adapter plate within said passageway therein; and
said latch finger extends into said adapter plate passageway for engaging with and disengaging from said passageway recess when said finger is deflected between its respective latching and unlatching positions.

10. The fuel assembly as recited in claim 9, wherein said latch finger has a latching key defined on its lower end being configured to engage said adapter plate within said recess formed in said passageway of said plate.

11. The fuel assembly as recited in claim 9, wherein:
said mounting body has a portion generally coextensive with said latch finger and defining a recessed region along said mounting body; and
said latch finger is disposed generally outside of said recessed region when in its latching position and generally within said recessed region when in its unlatching position.

* * * * *